Sept. 23, 1952 S. H. PERKY 2,611,472
CONVEYER APPARATUS FOR CARRYING TRAYS
Filed May 6, 1947 5 Sheets-Sheet 2
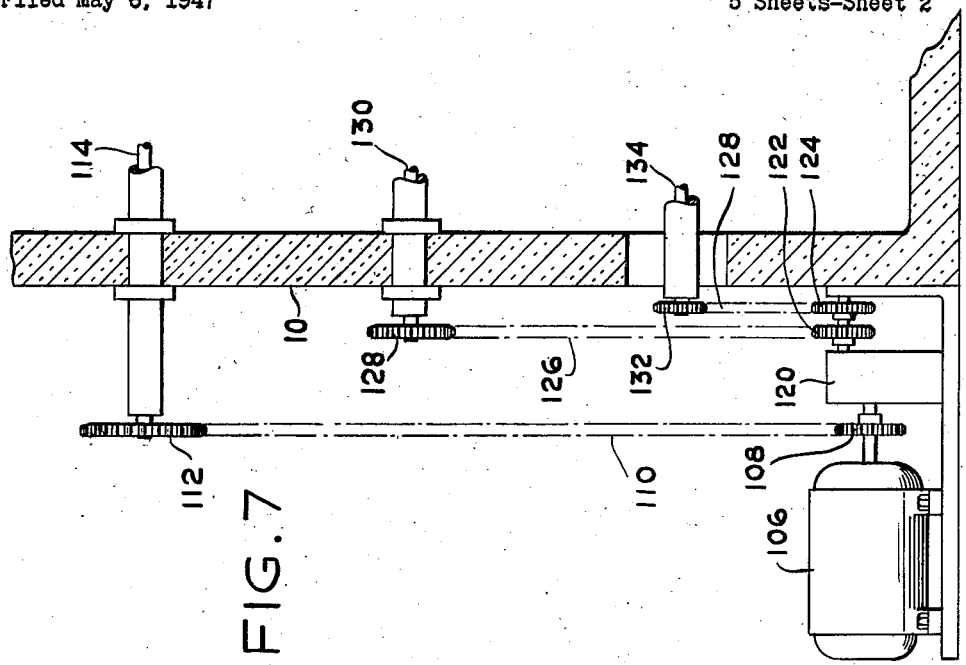
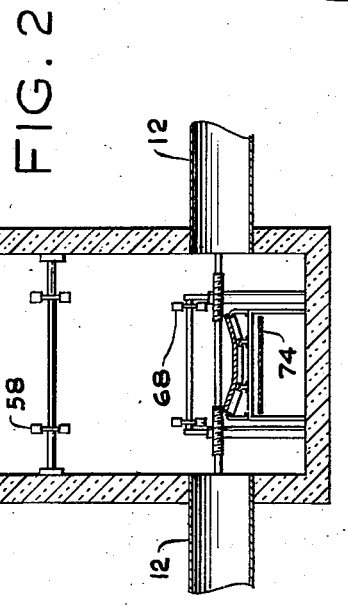
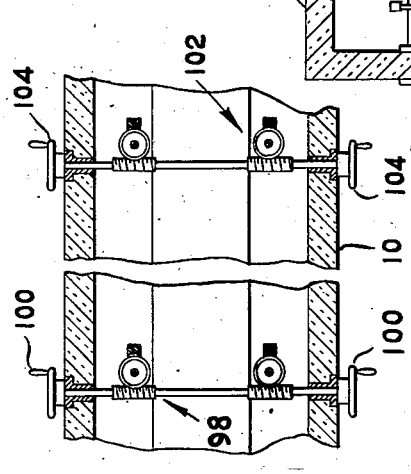
INVENTOR
SCOTT H. PERKY
BY
Toulmin & Toulmin
ATTORNEYS

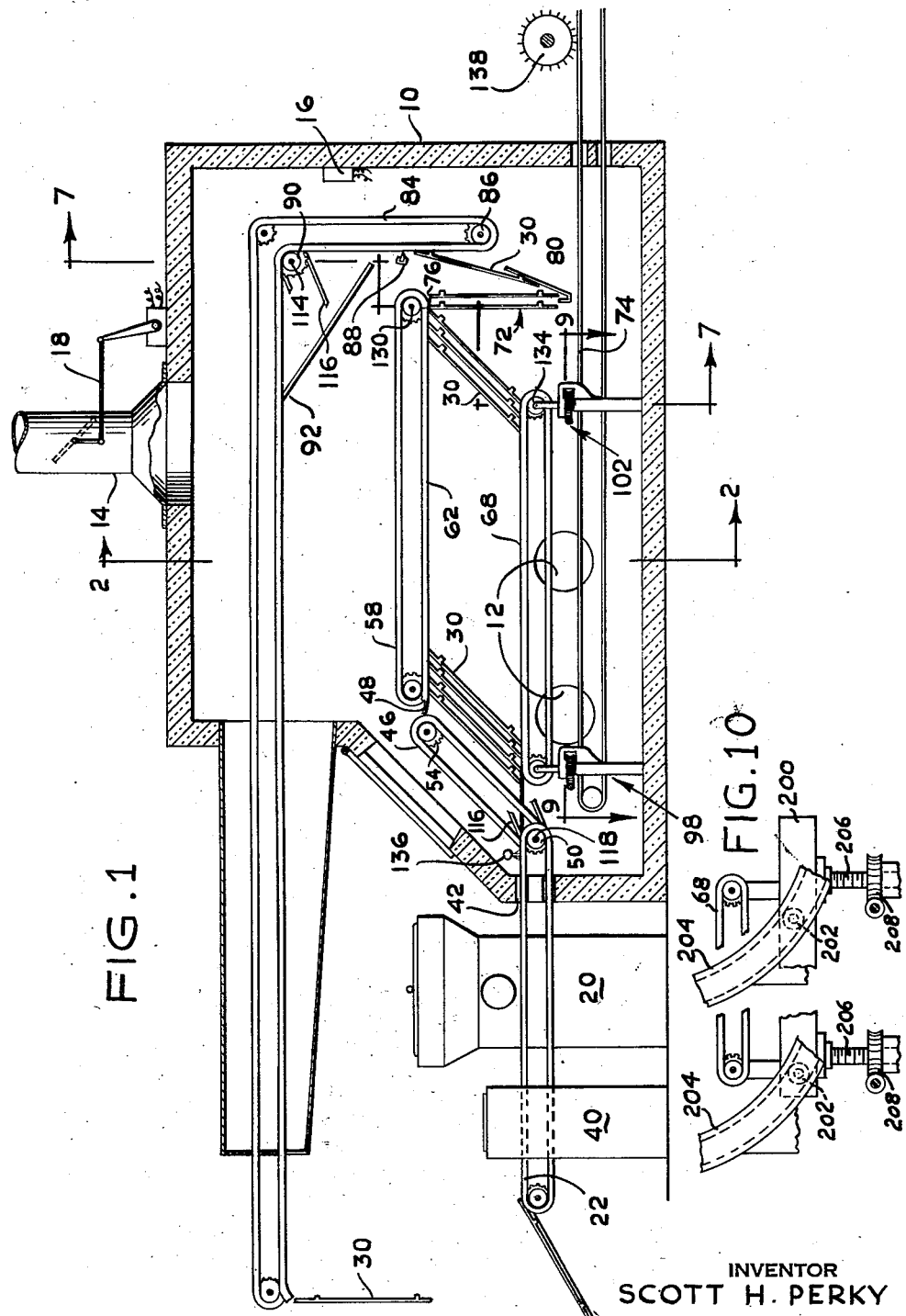

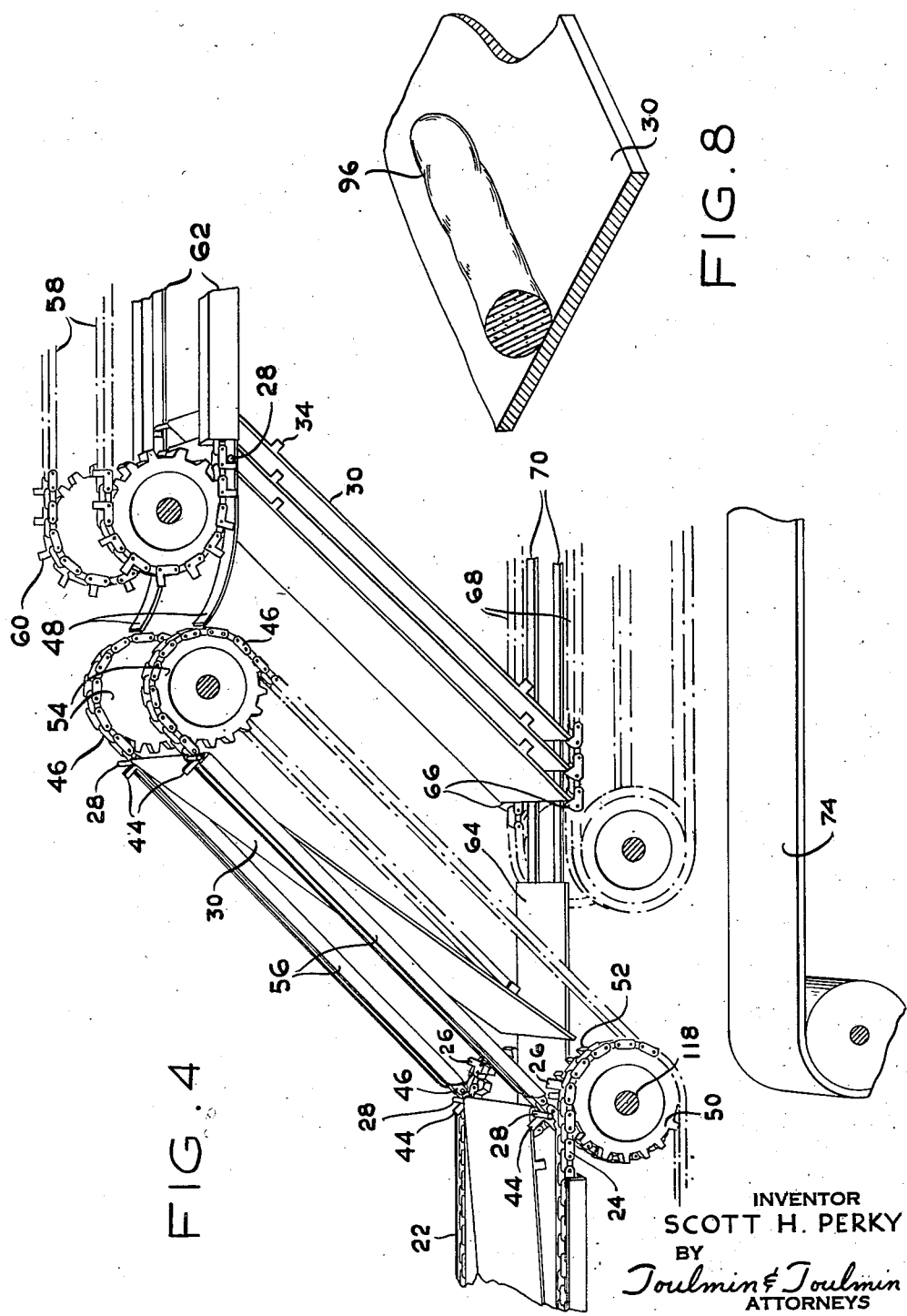

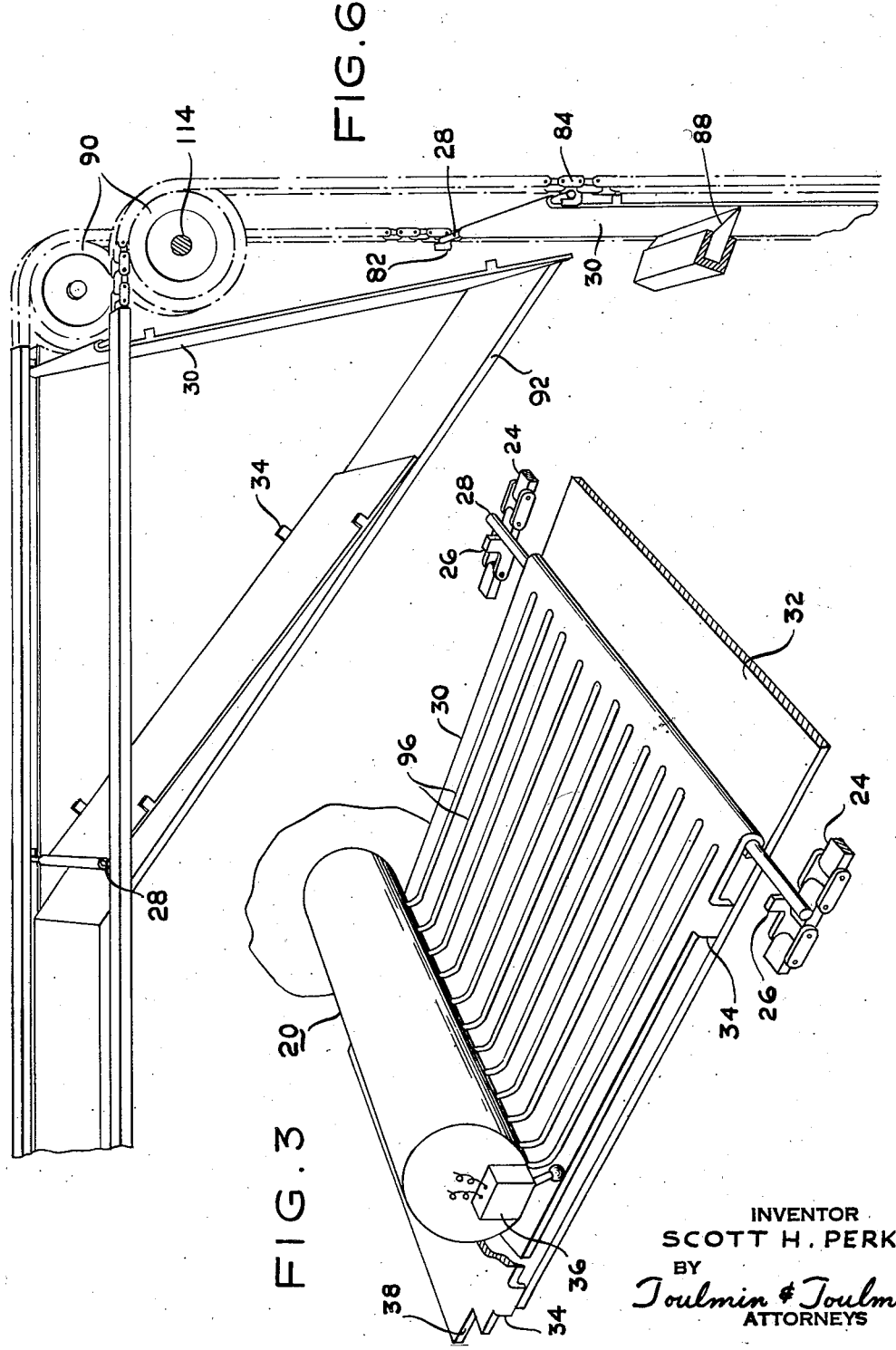

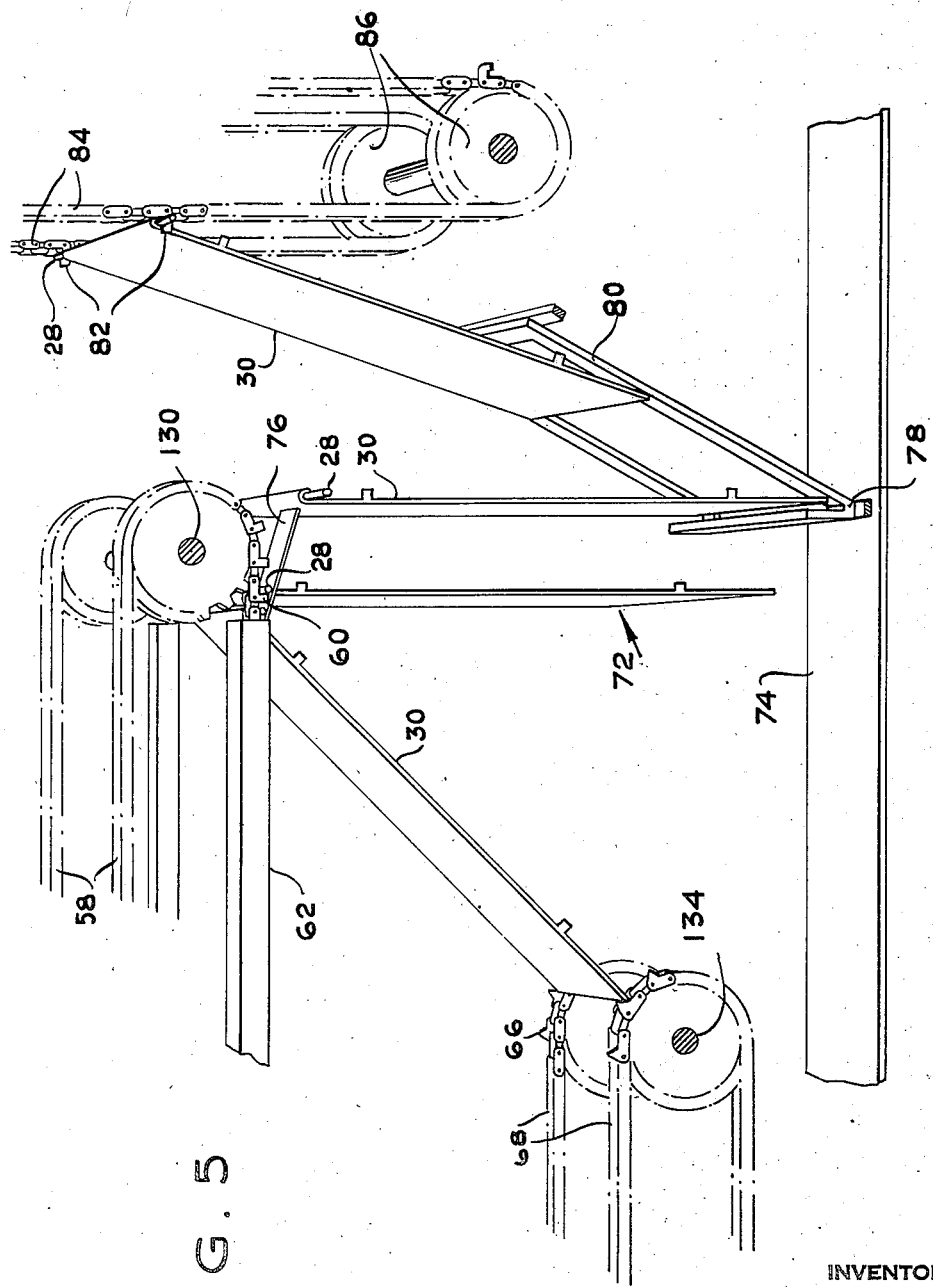

Patented Sept. 23, 1952

2,611,472

UNITED STATES PATENT OFFICE 2,611,472

CONVEYER APPARATUS FOR CARRYING TRAYS

Scott H. Perky, Keeseville, N. Y.

Application May 6, 1947, Serial No. 746,296

5 Claims. (Cl. 198—192)

This invention relates to improved methods and apparatus in connection with the production of food products, and especially in connection with baked food products.

The primary object of the present invention is to provide a method for baking articles which makes more economical use of the oven space and which produces a superior article.

It is also an object of this invention to provide a method of baking articles such as sticks so that the said stick is not flattened or otherwise deformed in passing through the oven.

A still further object of the present invention is to provide a method of baking food products in an oven so that a substantially continuous cycle obtains thereby utilizing the oven to the greatest advantage.

Another object is to provide a baking oven and means of conveying articles to be baked through the oven in a manner that the space in the oven is utilized to the greatest advantage.

A still further object is to provide an oven having means for conveying articles to be baked therethrough in which the pans or trays on which the articles are placed are tilted at variable angles through their passage through the oven thereby to retain the articles on the said pans with the pans spaced as close as possible at all times.

These and other objects and advantages will become more apparent upon reference to the following description taken in connection with the accompanying drawings in which:

Figure 1 is a vertical section through an oven constructed according to this invention;

Figure 2 is a transverse section through the oven and is indicated by the line 2—2 on Figure 1;

Figure 3 is a perspective view at the charging end of the oven showing the material to be baked being placed on one of the oven trays;

Figure 4 is a perspective view at the charging end of the oven showing the conveying means by which the trays are fed into the oven and tilted;

Figure 5 is a perspective view at the discharge end of the oven showing how the trays are further tilted to a vertical position to discharge the baked workpieces therefrom;

Figure 6 is a perspective view showing the return conveyor by means of which the trays are carried back to the charging end of the oven;

Figure 7 is a vertical section indicated by the line 7—7 on Figure 1 and showing the driving mechanism for the several conveyors in the oven;

Figure 8 is a fragmentary perspective view showing a workpiece on one of the trays;

Figure 9 is a plan view taken on the line 9—9 of Figure 1 and showing the means for raising and lowering the lower conveyor chains; and Figure 10 is a diagrammatic view showing another manner of vertically adjusting the lower conveyor in the oven.

General arrangement

According to this invention there is provided an oven having therein conveyor means for carrying separate trays of articles to be baked. The trays are filled or loaded prior to their entry into the oven at the charging end thereof by being placed in a horizontal position beneath a suitable automatic feeding mechanism.

After passing beneath the feeding mechanism the trays enter the charging end of the oven and are thereupon tilted upwardly at their forward ends. Upon becoming tilted the speed of the movement of the trays decreases materially so that they become positioned much closer together during their travel through the oven in their tilted position.

The trays pass through the oven in their tilted position while being exposed to heat such as hot gases or radiant heat whereby the articles thereon become baked. The particular angle to which the trays are tilted may be selectively adjusted to the best angle, and furthermore, this angle may be varied during the passage of the trays through the oven in order to prevent the articles from falling therefrom as they become surface dried due to the oven heat.

At the end of the travel of the trays in their tilted position, at which time the articles thereon are completely baked, the trays swing to a vertical position thus discharging all work pieces therefrom. From the vertical position, the trays are picked up by a conveyor means which carries them upwardly and backwardly toward the charging end of the oven where they are returned to the conveyor which passes them beneath the feeding mechanism. There is preferably provided a conveyor passing through the oven which receives the discharged articles from the trays and conveys them to suitable weighing and packaging stations.

The cycle provided for is full automatic and suitable control means may be provided for varying the oven temperature, humidity, etc. in order to predetermine the characteristics of the article produced.

Structural arrangement

Referring to the drawings there is shown an oven comprising a shell 10 which has the interior thereof heated in any suitable manner, as by the inlets 12 which supply heated gases to the oven and the discharge opening 14 in which the said gases pass from the oven. Any suitable control means may be provided, as, for example, the thermostat means at 16 and the automatically controlled damper means at 18 in the discharge 14.

At the left end of the oven, as viewed in Figure 1, there is a feeding mechanism 20 adapted for depositing the material to be baked on trays conveyed beneath the said mechanism by a conveyor 22. The conveyor 22 consists of a pair of spaced chains 24 best seen in Figure 3 which have thereon upstanding lugs as at 26 which engage a bar 28 projecting from each side of the forward edge of the tray 30. There is preferably a guide rail or plate 32 positioned between the chains 24 and on which the tray 30 rests by its legs 34.

For controlling the feeding of material to the trays during their passage beneath the feeding mechanism 20, there is provided a limit switch 36 or other feed control means which may be adapted for being engaged by the forward edge of the trays as they come beneath the feeding mechanism. For halting the feeding of the mechanism 20 the trays may be notched as at 38 whereby the actuation of the control means 36 is interrupted at the proper time.

For preparing the trays for receiving the material to be baked there may be a station 40 positioned ahead of the feeding mechanism 20 and through which the trays pass on the conveyor 22 and receive a coating of oil, flour, or other substance to prevent the sticking of the articles to the tray.

After the trays have passed beneath the feeding mechanism 20 they are conveyed through the charging opening 42 of the oven and the bars 28 on the said trays are carried into position to be engaged by the upstanding lugs 44 on the spaced conveyor chains 46. The conveyor chains 46 are inclined upwardly and carry the forward ends of the trays upwardly and deposit them on the downwardly inclined guide rails 48.

This mechanism is best seen in Figure 4 wherein it will be noted that the right hand ends of the chains 22 pass around the sprockets 50 which are carried on the same shaft with the sprockets 52 which receive the lower ends of the chains 46. The upper ends of the chains 46 pass around the sprockets 54 and in so doing release the bars 28 so that they fall on the guide rails 48. Preferably, although not necessarily, the upper reaches of the chains 46 are carried in guide rails or channels 56 as shown in Figure 4.

The inclined guide rails 48 pass beneath another part of spaced conveyor chains 58 which also have lugs 60 thereon for engaging the bars 28. Thus, when the trays are released from the chains 46 and slide down the guide rails 48 they are picked up by the lugs 60 and carried horizontally through the oven on the supporting rails 62.

During the tilting of the trays the lower ends thereof are supported on the rails 64 and at about the time the rods 28 are engaged by the lugs 60 the lower ends of the trays are picked up by the projections or lugs 66 on the spaced chains 68. There is preferably provided adjacent the chains 68 the rails 70, which, together with the rails 62, predetermine the angular position which the trays occupy.

The speed of operation of the chains 58 and 68 is substantially slower than the speed of the chains 22 and 46 so that the trays are substantially closer together during their conveyance by the chains 58 and 68. This enables the space within the oven to be utilized most economically and, since the trays are tilted to a considerable angle, there is substantially free passage of heated air therebetween for baking the articles carried thereon.

After the trays have progressed through the oven to the right ends of the conveyor chains 58 and 68 as viewed in Figure 1, the lower ends of the trays are released from the chains 68 and the trays then swing into a vertical position as best seen in Figure 5. At this time the upper ends of the trays are held by the lugs 60 for a sufficient length of time to permit the trays to assume a completely vertical position as shown by the tray at 72 in Figure 5. Any baked articles remaining on the tray at this time will then drop therefrom to the conveyor 74 on which they are carried from the oven. It will be understood that, depending upon the angle which the trays occupy, the baked material may fall therefrom during the passage of the trays through the oven, or remain thereon until the trays have reached the discharge end of the oven.

As the trays are released by the upper conveyor chains 58, they drop from the inclined end portions 76 of the guide rails 62 and fall vertically against a bracket 78 which is so positioned and shaped that it moves the lower end of the tray backwardly thereby causing the tray to fall forwardly against the frame 80. In this position the upper ends of the trays which carry the bars 28 are positioned to be engaged by the lugs 82 on the conveyor chains 84. Picking up of the trays is best seen in Figure 5 wherein it will be observed that the chains 84 are passing vertically upwardly and have their lower ends supported by the shafted together sprockets 86.

During the vertical travel of the trays when carried by the chains 84, they are preferably engaged by a yieldable scraper blade 88 as seen in Figure 6 thereby to remove any baked articles remaining thereon and in general to prepare the surface of the tray for receiving other articles.

The vertical travel of the trays continues until the chains 84 pass around the sprockets 90 and commence their horizontal movement toward the charging end of the oven. At this time, the lower edges of the trays are engaged by the guide plate 92 which supports the said lower edge so that the trays are positioned substantially horizontal during their return movement to the charging end of the oven. This reduces the vertical dimensions of the oven and results in a more economical arrangement. It will be apparent that the speed of movement of the chains 84 is much more rapid than that of the chains 58 and 68 and approaches, if not equals, a speed of the chains 22 and 46. This is necessary to remove each tray from the bracket 78 before the next falls therein.

At the charging end of the oven the trays are again released from the conveyor chains 84 and fall vertically downwardly into a platform or frame 94. From the platform 94 the trays fall forwardly to present their forward end carrying the bar 28 to the conveyor chain 22 and thereafter the foregoing work cycle is repeated.

While the present mechanism has been especially designed for baking articles in the stick form as shown at 96 in Figures 3 and 8, it will be apparent that it may also be used for cookies, crackers, and the like if desired.

In order to accommodate the oven to various usages the conveyor chain 68 is vertically adjustable in order to vary the angularity at which the trays are carried through the oven. This adjustability is accomplished by means of the mechanism generally indicated at 98 in Figures 1 and 9 which show a hand wheel 100 external of the oven which permits adjustment of the said angularity during operation if found necessary.

In some cases the articles being baked will surface dry rather quickly without being baked completely through. Such articles are apt to fall from the tray before they are completely baked. For handling articles of this nature there is preferably provided the additional means such as the cams at 102 which may be adjusted from outside of the oven as by the hand wheels 104 for raising and lowering the right end of the chain 68 relative to the left end thereof. By this expedient the angularity of the trays may be varied during their passage through the oven thus to retain the articles thereon for the greatest length of time.

The driving mechanism by which the several conveyors are driven is best seen in Figure 7 wherein there will be seen the motor 106 which drives into a sprocket 108 over which passes a chain 110 leading to a sprocket 112 mounted on the shaft 114 which carries the sprockets 90 of the conveyor chain 84. As indicated in Figure 1 the chain 116 drivingly connects the shafts 114 and 118 on which are mounted the sprockets 50 of the conveyor chain 22 and the sprockets 52 of the conveyor chain 46.

The motor 106 also drives through the gear reduction unit 120 into the sprockets 122 and 124 which drive, respectively, the chains 126 and 128. Chain 126 also engages a sprocket 128 on the shaft 130 which supports the right hand end of the chains 58. In turn, the chain 128 passes over the sprocket 132 which is mounted on the shaft 134 that supports the sprockets at the right hand end of the chains 68. By this arrangement all of the conveyor chains are driven in synchronism and at the proper relative speeds.

It will be obvious that other refinements may be provided for in the oven mechanism. For example, at the charging end of the oven there may be a spray pipe or brushing device as at 136 which supplies a coloring or browning substance to the articles on the trays as they enter the oven. Likewise, there may be a brush or similar device as at 138 at the discharge end of the oven by means of which the articles may be brushed, polished or otherwise treated following baking.

It will be noted that the tilting of the trays into a vertical position thereby causing their crowding together, utilizes the oven space to the greatest possible advantage. Furthermore, this tilting of the trays tends to prevent the flattening out of articles such as cylindrical sticks or thick cookies during the baking. Also, the trays in their tilted position are well adapted for receiving heated air forced into the oven and for directing it over the articles being baked. This is an efficient arrangement which results in uniform baking of all workpieces.

In certain instances it may be desirable, or necessary, to adjust the angle to which the trays are tilted during their travel through the oven. This may be accomplished by the arrangement shown in Figure 10 wherein the lower conveyor 68 is carried on a platform 200 which has thereon the rollers 202 at its opposite ends which extend into a pair of arcuate cam tracks 204. Slidably abutting the bottom surface of the platform 200 are the upper ends of a pair of elevating screws 206 which are operable from externally of the oven through the worm and wheel arrangements 208. The curve of the arcuate cam tracks 204 is such that the ends of the tilted trays remain in engagement with both the upper and lower conveyors during the movement of the lower conveyor. This enables the angle to which the trays are tilted to be adjusted at any time during the travel of the trays through the oven.

It will be understood that this invention is susceptible to modification in order to adapt it to different usages and conditions and, accordingly, it is desired to comprehend such modifications within this invention as may fall within the scope of the appended claims.

I claim:

1. In an oven; conveyor means for supplying article carrying trays to the charging end of said oven in a substantially horizontal position; a second conveyor means at the charging end of said oven for tilting the leading edge of said trays upwardly in the direction of travel thereof; and other conveyor means positioned adjacent said second conveyor means and extending through said oven and including means for receiving the tilted trays in a substantially forward movement of the upper said leading edge thereof and for conveying them therethrough in their tilted position, said other conveyor means comprising upper and lower conveyor elements, said upper element extending further forwardly into said oven than the said lower element whereby said tilted trays are released by said lower element prior to release by said upper element thereby permitting said trays to swing to a substantially vertical position.

2. In an oven; conveyor means for supplying article carrying trays to the charging end of said oven in a substantially horizontal position; a second conveyor means at the charging end of said oven for tilting the leading edge of said trays upwardly in the direction of travel thereof; other conveyor means positioned adjacent said second conveyor means and extending through said oven and including means for receiving the tilted trays in a substantially forwardly movement of the upper said leading edge thereof and for conveying them therethrough in their tilted position, said other conveyor means comprising upper and lower conveyor elements which position the said tilted trays therebetween; and means for raising said lower conveyor element towards said upper conveyor element for predetermining the degree of tilt of the said trays positioned between the said elements.

3. In an oven; conveyor means for supplying article carrying trays to the charging end of said oven in a substantially horizontal position; a second conveyor means at the charging end of said oven for tilting the leading edge of said trays upwardly in the direction of travel thereof; other conveyor means positioned adjacent said second conveyor means and extending through said oven and including means for receiving the tilted trays in a substantially forwardly movement of the upper said leading edge thereof and for conveying them therethrough in their tilted position, said other conveyor means comprising upper and lower conveyor elements which position the said tilted trays therebetween; and means for raising one end of said lower conveyor element relative to the other end of said lower element to vary the degree of tilt of trays positioned thereon while passing through the said oven.

4. A conveyor system for carrying trays forwardly through a baking oven comprising a first conveyor including spaced chains having lugs thereon for engaging said trays and moving the same forwardly while raising the leading edge thereof above the rearward edge to incline the said trays, the said rearward edge passing between the spaced chains, a support positioned below the upper forward edge of said conveyor to receive the rearward edge of said trays thereon and support the same in their tilted position, and another conveyor adjacent said first conveyor and having extending arms to receive the upper said leading edge of said inclined trays in a substantially forward motion thereof and pass the trays forwardly in said oven in an inclined position.

5. A conveyor system for carrying trays forwardly through a baking oven comprising a first conveyor including spaced chains having lugs thereon for engaging said trays and moving the same forwardly while raising the leading edge thereof above the rearward edge to incline the said trays, the said rearward edge passing between the spaced chains, a support positioned below the upper forward edge of said conveyor to receive the rearward edge of said trays thereon and support the same in their tilted position, another conveyor adjacent said first conveyor and having extending arms to receive the upper said leading edge of said inclined trays in a substantially forward motion thereof and pass the trays forwardly in said oven in an inclined position, said other conveyor having upper and lower spaced elements for positioning said trays therebetween, and cam means on said lower element for raising the right end thereof relative to the left end for varying the degree of tilt of said trays during the travel thereof.

SCOTT H. PERKY.

REFERENCES CITED

The following references are of record in the file of this patent:

UNITED STATES PATENTS

| Number | Name | Date |
|---|---|---|
| 444,379 | Fowler | Jan. 6, 1891 |
| 1,319,077 | Hickcox | Oct. 21, 1919 |
| 1,333,769 | O'Donnell | Mar. 16, 1920 |
| 1,346,339 | Routt et al. | July 13, 1920 |
| 1,468,181 | Wagner | Sept. 18, 1923 |
| 1,633,236 | Troiel | June 21, 1927 |
| 1,668,995 | Woolever | May 8, 1928 |
| 1,675,943 | Mairich | July 3, 1928 |
| 1,692,515 | Oviedo | Nov. 20, 1928 |
| 1,772,024 | Baker | Aug. 5, 1930 |
| 1,830,359 | Hamel | Nov. 3, 1931 |
| 1,839,731 | Baum | Jan. 5, 1932 |
| 2,255,282 | Duffy | Sept. 9, 1941 |
| 2,318,438 | Voth | May 4, 1943 |
| 2,340,354 | Wells | Feb. 1, 1944 |
| 2,414,235 | MacManus | Jan. 14, 1947 |